April 12, 1966  W. E. STAPF  3,246,318
ILLUMINATED INDICATORS
Filed May 22, 1961
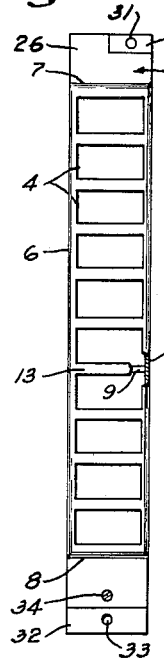
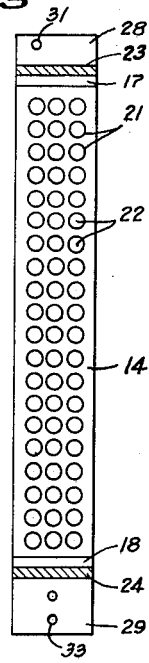
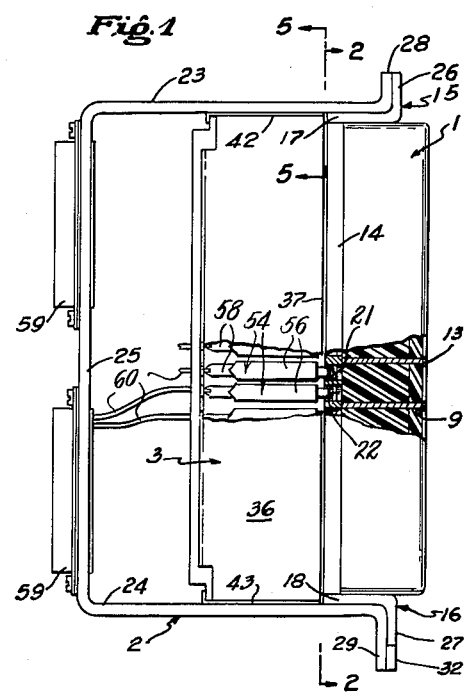
INVENTOR.
WILLIAM E. STAPF
BY
Arnold & Roylance

United States Patent Office

3,246,318
Patented Apr. 12, 1966

---

3,246,318
ILLUMINATED INDICATORS
William Edward Stapf, Alexandria, Va., assignor to American Machine & Foundry Company, a corporation of New Jersey
Filed May 22, 1961, Ser. No. 111,752
3 Claims. (Cl. 340—378)

This invention relates to illuminated indicators of the general type embodying a plurality of electric lamps which are energized selectively to provide an illuminated indication which is meaningful because of location and/or color.

Because of the widely increased use of automated equipment, complex communications systems, and the like, there has been an increasing need in recent years for devices capable of providing visual indications which are meaningfully representative of relatively complex sets of conditions, etc. In many cases, equipment must be operated in programmed fashion, requiring constant indication to the operator as to the stage of the program attained, operativeness of the equipment, and variations in conditions, for example. In communications systems, it is frequently necessary to provide visual indications as to the state of use or nonuse of lines in a complex network, and even as to the relative importance of the use to which a particular line is being put (e.g., whether a conversation being carried on over a given telephone line can be interrupted).

Prior-art workers have given much attention to the design and construction of illuminated indicators, and various devices of this type have achieved some measure of industrial acceptance. A great many such devices, however, have been unduly complex, too intricate and expensive, or inadequate from the standpoint of ruggedness and dependability to be truly satisfactory for numerous current applications. Accordingly, there has been a continuing need for improved devices of this type.

An object of the present invention is to provide an illuminated indicator which is capable of selective operation to give any of a relatively highly complex set of visual indications, but which is more compact, rugged and dependably serviceable than prior-art devices.

Another object is to devise an illuminated indicator which, though embodying means for uniformly illuminating a given viewing area selectively from any of a plurality of light sources which are not centered with respect thereto, does not depend for its physical strength on parts made from plastic or other light conducting materials. In this connection, the invention provides in one embodiment an illuminated indicator which, though it may employ one or a relatively large number of light conducting bodies of synthetic resinous composition, derives essentially all of its physical strength from a substantially rigid metal structure.

A further object is to provide an illuminated indicator embodying, for each viewing area, a plurality of color filters and a light conducting body of synthetic resinous composition, yet requiring none of the tedious coating and cementing procedures heretofore involved in producing such a device.

Still another object is to devise an illuminated indicator which is less expensive to manufacture, more compact, and distinctly more serviceable than prior-art devices capable of providing the same indications.

In order that the manner in which these and other objects are attained in accordance with the invention can be understood in detail, reference is had to the accompanying drawings, which form a part of this specification, and wherein:

FIG. 1 is a side elevational view of an illuminated indicator constructed in accordance with one embodiment of the invention, a portion thereof being broken away and some parts shown in vertical section for clarity;

FIG. 2 is a vertical sectional view, with some parts shown in elevation, taken on line 2—2, FIG. 1;

FIG. 3 is a front elevational view of the indicator shown in FIG. 1;

FIG. 4 is a top view of the device of FIG. 1, showing a portion of the main frame broken away for clarity;

FIG. 5 is a fragmentary sectional view taken on line 5—5, FIG. 1, with parts shown in elevation;

FIG. 6 is a detail view showing the relation between one of the indicator lamps and certain associated parts in the device of FIG. 1;

FIG. 7 is a fragmentary elevational view of a portion of a printed circuit board employed in the device of FIG. 1; and FIG. 8 is a perspective view of one of the light conducting units employed in the device of FIG. 1;

FIGS. 5–8 being on a larger scale than FIG. 1.

In the drawings, an embodiment of the invention has been illustrated which is capable of illuminating each of ten viewing areas selectively in any of six different colors. The device comprises an elongated housing 1, a main frame 2, and a lamp assembly 3. Formed in any conventional manner from a single metal sheet, housing 1 includes a front wall provided with ten rectangular windows 4, flat rectangular side walls 5 and 6, and flat end walls 7 and 8, the housing being open at its back. The interior of housing 1 is divided into separate chambers, each centered behind a different one of windows 4, by flat partitions 9 of metal. In each of the chambers so defined, there is disposed a light conducting unit 10, FIG. 8, which has flat front, side and rear faces and completely fills the chamber within which it is located.

Each light conducting unit 10 comprises a clear main body 11 secured directly to a light diffusing front plate 12. Thus, body 11 can be made of a transparent methyl methacrylate resin, for example, and plate 12 can be of any suitable translucent material, such as a vinyl chloride-vinyl acetate copolymer, for example.

Partitions 9 are materially thinner than the webs 13 of the front wall of housing 1 between adjacent ones of windows 4. The dimensions of each unit 10 are such that opposite side faces thereof each are disposed in flush engagement with a face of one of partitions 9. A marginal portion of the front face of the plate 12 of each unit 10 is in flush engagement with the rear face of the front wall of housing 1. The side edges of partitions 9 each are disposed in flush contact with one of housing side walls 5, 6, as are also the remaining side faces of units 10. The rear edges of side walls 5, 6 and end walls 7, 8 of housing 1, the rear edges of partitions 9, and the rear faces of units 10 all lie in a common plane parallel to the front wall of the housing.

Fixedly attached to housing 1 is a relatively thick, rigid, metal back plate 14 which has a flat front face disposed in engagement with the rear edges of housing walls 5–8, the rear edges of partitions 9 and the rear faces of light conducting units 10. Back plate 14 is rectangular, having the same side dimensions as housing 1, so that the sides of the back plate lie in the respective planes of the side walls of the housing and the ends of the back plate lie in the respective planes of the end walls of the housing. Rigid attachment of back plate 14 to housing 1 is accomplished by metal brackets 15 and 16 having flat portions 17 and 18, respectively, which extend rearwardly along the outer faces of end walls 7 and 8, respectively, and project across the ends of the back plate, as shown. Bracket 15 is secured to housing end wall 7 by countersunk screws 19, FIG. 4, and to the corresponding end of back plate 14 by countersunk screws 20. Bracket 16 is secured in identical fashion to housing end wall 8 and the other end of back plate 14. Thus rigidly secured to the housing, the back plate serves not only to close the back of the housing but also to clamp the partitions 9 and light conducting units 10 firmly in position.

Portions of back plate 14 lie in engagement with the rear face of each light conducting unit 10. In each such portion, the back plate is provided with six cylindrical bores 21 arranged in two rows with three bores in each row, the rows extending transversely across the back plate and the axes of the bores all being parallel with each other and at right angles to the rear faces of light conducting units 10. Bores 21 are identical and each extends completely through the back plate.

Disposed each in a different one of bores 21 are a plurality of flat, circular color filters 22, FIG. 6. Each color filter 22 has substantially the same diameter as the bore in which it is mounted and therefore completely closes the bore. The color filters are thin, as compared to the depth of the bores, and all lie with one face located in the plane of the face of the back plate which engages the units 10, so that the color filters also are disposed in flush contact with the rear faces of the corresponding ones of units 10. Advantageously, color filters 22 are press-fit into the bores in which they are located. The color filters can be of essentially transparent methyl methacrylate, for example, appropriately tinted. Thus, each group of six bores may include a red, a green, an amber, a yellow, a blue and a white filter. By comparing FIGS. 1–3, it will be understood that the location of all bores of each group of six bores is uniformly spaced in rectangular fashion within the rectangular area of the rear face of the corresponding light conducting unit 10.

Frame 2 consists of a single strip of metal bent to provide parallel arms 23 and 24, FIG. 1, connected by a portion 25. The free ends of arms 23 and 24 extend in flush contact with the exposed main faces of portions 17 and 18, respectively, of brackets 15 and 16. Brackets 15 and 16 include flat portions 26 and 27, respectively, which lie in a common plane and project outwardly at right angles to housing end walls 7 and 8. At their free ends, arms 23 and 24 have integrally formed outwardly projecting ears 28 and 29, respectively, ear 28 being disposed in face-to-face engagement with the rear face of flat portion 26 of bracket 15 and ear 29 being similarly engaged with portion 27 of bracket 16. The end of bracket portion 26 is notched rectangularly and frame ear 28 is provided with a forwardly directed rectangular projection 30, FIG. 3, of the same thickness as bracket portion 26 and so dimensioned as to completely fill the notch in that portion. A threaded mounting hole 31 extends through projection 30 at right angles to the plane of bracket portion 26. Ear 29 projects outwardly beyond the tip of bracket portion 27 and is provided with a forwardly projecting extension 32 of the same thickness as bracket portion 27, extension 32 being of rectangular form, as will be clear from FIG. 3, and of such dimensions as to constitute, in effect, a continuation of bracket portion 27. A threaded mounting hole 33 extends through extension 32 at right angles to the plane of bracket portion 27. Ear 29 and bracket portion 27 are secured together by screw 34, FIG. 3. Projection 30 and extension 32 can be secured to ears 28 and 29, respectively, by rivets, by welding or by other suitable means.

The dimensions of brackets 15 and 16 are such that the front faces of portions 26 and 27 thereof lie in a common plane spaced rearwardly from the front of housing 1. The indicator is intended for mounting on a panel, not shown, the panel being provided with a rectangular opening to accommodate housing 1 and mounting being accomplished by screws or other fasteners extending through suitable openings in the panel and engaged in holes 31 and 33. It will be clear that such mounting causes ear 28 and bracket portion 26 to be firmly clamped together and rigidly supports both housing 1 and main frame 2.

Lamp assembly 3 includes two identical side frame members 35 and 36 each fabricated from stiff sheet metal. The side frame members 35 and 36 have plain straight edges, as indicated at 37, FIG. 1. Throughout most of their length, the rear edges of the side frame members are bent inwardly to provide flanges 38 and 39, respectively, FIG. 5. The ends of the side frame members are bent inwardly at right angles to provide mounting ears 40 and 41, respectively, FIG. 5. In the final assembly, the side frame members are so disposed that the main bodies thereof are parallel and lie respectively in the planes of the side edges of frame arms 23 and 24. Between arm 23 and the adjacent pair of mounting ears 40, 41, there is disposed a thin sheet metal stop member 42. An identical stop member 43, FIG. 1, is disposed between frame arm 24 and the pair of mounting ears 40, 41 adjacent thereto. The pair of mounting ears 40, 41 adjacent to frame arm 23 is secured rigidly to arm 23 by countersunk screws 44, FIG. 4, the screws extending through stop member 42 and being threaded into ears 40, 41. The opposite ends of side frame members 35 and 36 are rigidly secured in the same fashion to frame arm 24. Thus, the mounting of side frame members 35, 36 serves both to rigidly support lamp assembly 3 and to rigidify the main frame.

A printed circuit board 45 is disposed in contact with the inner face of frame member 35 and a second printed circuit board 46 is similarly disposed in contact with the inner face of frame member 36. Two additional printed circuit boards 47 and 48 are disposed within the space between frame members 35 and 36 and are parallel to those frame members. Each of the boards 45–48 is provided with nineteen spaced parallel slots 49, FIG. 7, which are open at the edge of the board adjacent back plate 14 and which extend for a substantial portion of the width of the board.

Nineteen cross sheets of insulating material 50 are arranged to extend between side frame members 35 and 36, each cross sheet being disposed in a different one of the slots 49. Adjacent each pair of ears 40, 41, at the ends of the lamp assembly 3, the ends of the printed circuit boards 45–48 are separated and positioned by spacers 51 of insulating material. Thus, the printed circuit boards 45–48 and the cross sheets 50 are arranged in grid fashion and define sixty lamp accommodating chambers 52, FIG. 5, which are elongated in a direction at right angles to the front face of the device and are of squared transverse cross section.

Each of the printed circuit boards 45–48, FIGS. 5 and 7, is provided on both of its major faces with a plurality of electrically conductive portion 53, each conductive portion 53 being disposed between adjacent pairs of slots 49 and extending to the rear edge of the printed circuit board. The bodies of boards 45–48 are of electrical insulating material and the conductive portions 53 are electrically independent from each other. Within each chamber 52 there is located a miniature incandescent electric lamp 54, one of which is seen in detail in FIG. 6. Each lamp 54 is of the conventional type comprising an elongated, generally cylindrical, sealed incandescent bulb 55 and side contacts 56 and 57. While the filament of the lamp has been omitted from FIG. 6 for clarity of illustration, it will be understood that the filament leads extend through the insulating walls of bulb 55 and are soldered or otherwise electrically connected to the side contacts 56 and 57, the side contacts being securely fastened to the bulb and serving to support the same. Each side contact is an elongated sheet metal member, the main body thereof embracing bulb 55 and including outwardly directed flat faces indicated at 56a and 57a, FIG. 6. The ends of contacts 56 and 57 project rearwardly from bulb 55 and are engaged in and secured by an insulating block 58 to complete the lamp. Bulb 55 includes a nose portion 55a which projects for a substantial distance beyond the tips of side contacts 56, 57 and is of a diameter slightly smaller than the diameter of bores 21.

When lamps 54 are disposed within chambers 52, the parallel faces 56a and 57b of the side contacts of the lamps lie in flush engagement with the ones of electrically conductive portions 53 which are opposed across the chamber in which the lamp is disposed. The dimensions of the parts of lamp assembly 3 are such that the lamps 54 are firmly clamped between the adjacent pairs of printed circuit boards, FIG. 5.

Lamp assembly 3 is so mounted that the front edges 37 of the side frame members 35 and 36 are at least immediately adjacent to the rear face of back plate 14. Advantageously, edges 37 can be disposed in direct, firm contact with back plate 14. All of the lamps 54 are so disposed within the assembly 3 that nose portions 55a of lamp bulbs 55 project forwardly from assembly 3 each into a different one of the bores 21 in the back plate, so that the tips of the lamps are disposed in immediate proximity to the rear faces of color filters 22. Energization of any of the lamps 54 will supply light, via the corresponding one of color filters 22, to the rear face of the light conducting element 11 with which that color filter is engaged. The light supplied by the energized lamp, after passing through the color filter, will be conducted forwardly by element 11, diffused by the corresponding element 12 and can be viewed through the corresponding window 4.

Straight portion 25 of frame 2 is provided with two elongated rectangular openings in each of which is mounted one portion of a conventional multiple plug type electrical connector 59. The two connectors 59 provide a number of contact elements at least equal to the number of electrically conductive portions 53 of the printed circuit boards necessary to complete the electrical circuits for energizing lamps 54 selectively in the desired fashion. The contact elements of connectors 59 are each connected electrically to one of the conductive portions 53 of the printed circuit boards via insulated wires typically illustrated at 60, FIG. 3, extending across the space between the connectors 59 and the back of the lamp assembly 3. The circuits to lamps 54 can be selectively controlled by conventional switching devices in usual fashion to provide selective energization of the lamps and thus selective indication by means of illumination of the desired color at windows 4. For example, any one of the six lamps 54 located behind the light conducting unit 10 aligned with the lowermost one of windows 4, as viewed, can be energized to provide red, green, amber, yellow, blue or white illumination at that window. Diffusing elements 12 can be plain, so that the user depends solely on the color and location of the illumination for the meaningfulness of the indication. Alternatively, diffusing elements 12 can bear suitable indicia applied in any conventional fashion so that meaningfulness can depend on various combinations of location and color of the illumination in conjunction with selected indicia.

In the embodiment shown, the entire light conductive assembly contained within housing 1 is a thoroughly rigid structure, all of the light conducting units 10 and the partitions 9 being held in fixed position by reason of being clamped mechanically by rigid back plate 14 and the walls of housing 1. The combination of the transparent light conducting element 11 and diffusing element 12 in each unit 10 serves to provide substantially uniform illumination over the corresponding one of windows 4 from any of the lamps 54 associated therewith.

Provision of a relatively thick, rigid metal back plate, with through bores corresponding to the lamps employed, and with the color filters each fixedly mounted in the front end of a different one of the bores, serves the dual function of providing simple means for rigidly retaining the light conducting units 10 and assuring firm face-to-face engagement between the color filters and the corresponding light conducting units, without requiring the use of adhesives to bond the filters to the light conducting units or to secure the light conducting units in place. Partitions 9 cooperate with the walls of housing 1 and with back plate 14 to define chambers which are light-tight except for windows 4 and bores 21. Further, the mechanical strength of the light conducting assembly is derived primarily from the metal housing 1, the metal back plate 14, and brackets 15 and 16, so that dependence is not placed upon plastic or like nonmetallic elements for strength and resistance to vibration and shock.

What is claimed is:
1. In an illuminated indicator, the combination of
   a rigid, opaque, hollow housing including
      a flat front wall having a plurality of viewing windows, and
      side wall means extending rearwardly from said front wall and including rear edge portions lying in a common plane parallel to said front wall,
      the back of said housing being open;
   a rigid, flat, opaque back plate extending across said rear edge portions of said side wall means and closing the open back of said housing,
      said back plate having a plurality of spaced openings each directed toward one of said viewing windows;
   a plurality of flat, opaque partitions extending across the interior of said housing and dividing the same into a plurality of compartments each disposed behind a different one of said viewing windows,
      each of said partitions having a front edge engaged with the front wall of said housing and a rear edge engaged by said backing plate;
   two rigid mounting brackets exterior to said housing and each fixedly secured to opposed ends of said side wall means and projecting rearwardly beside said back plate;
   fastener means rigidly securing said back plate to said mounting brackets,
      said mounting brackets and fastener means maintaining said back plate in engagement with said rear edge portions of said side wall means,
      said partitions being clamped between said back plate and said front wall;
   a plurality of color filters each secured within a different one of said openings in said back plate,
      the thickness of said back plate being substantially greater than the thickness of said color filters,
      said color filters being disposed adjacent the front face of said back plate;
   a lamp assembly disposed behind said back plate and comprising a plurality of electric lamps each projecting forwardly into a different one of said openings in said back plate; means securing said lamp assembly to said housing; and
   a plurality of light-diffusing members carried by said housing and each closing a different one of said viewing windows.

2. An illuminated indicator in accordance with claim 1 and wherein
   each of said light-diffusing members completely closes the front portion of a different one of said compartments,
   the illuminated indicator further comprising a plurality of light-conducting blocks,
      each of said blocks being disposed behind one of said light-diffusing members in a different one of said compartments and extending rearwardly from such light-diffusing member into engagement with the front face of said back plate,
      the combination of the light-diffusing member and light-conducting block in each of said compartments being clamped between said back plate and the front wall of said housing, such combination of light-diffusing member and light-conducting block completely filling the one of said compartments in which it is disposed.

3. An illuminated indicator in accordance with claim 1 and wherein
said housing is of rectangular transverse cross section and said side wall means includes four flat walls all having their rear edges disposed in said common plane,
said back plate is rectangular and of such size that its respective edges lie in common planes with the corresponding outer surfaces of the side walls of said housing, and said mounting brackets includes straight portions extending rearwardly along the outer surfaces of said side walls and in direct engagement with the corresponding edges of said back plate.

References Cited by the Examiner
UNITED STATES PATENTS

| | | | |
|---|---|---|---|
| 2,740,957 | 4/1956 | Davies | 340—380 |
| 2,843,845 | 7/1958 | Vozza | 340—378 |
| 2,880,536 | 4/1959 | Sullivan | 340—380 |
| 2,945,313 | 7/1960 | Hardesty | 340—366 |
| 2,967,298 | 1/1961 | Riggens et al. | 340—381 |
| 3,103,659 | 9/1963 | Edwards | 340—378 |

NEIL C. READ, *Primary Examiner.*

E. JAMES SAX, *Examiner.*